United States Patent Office 3,334,976
Patented Aug. 8, 1967

3,334,976
PROCESS TO RENDER INNOCUOUS WATER PRESENT IN PETROLEUM DISTILLATES AND INHIBIT BACTERIA GROWTH
Robert S. Norris, 26 Valley Road,
Larchmont, N.Y. 10538
No Drawing. Filed July 29, 1963, Ser. No. 298,483
4 Claims. (Cl. 44—51)

This invention relates to a process whereby the water present in petroleum distillates may be rendered innocuous and to inhibit bacteria growth.

Applicant claims ownership of United States Patents Nos. 3,002,825 and 3,002,826, both issued Oct. 3, 1961.

Water usually is present in all petroleum distillate products, such as naphthas, kerosine, jet engine fuels, and diesel fuels. This water is present both as dissolved water and as free or dispersed water. A jet engine fuel ordinarily will dissolve water in parts per million about equivalent to the temperature in degrees Fahrenheit. For example, a jet fuel at 70° F. will dissolve approximately 70 parts per million of water. In spite of all precautions, such fuel becomes saturated due to transportation procedures and the venting of tanks.

Water in jet fuels and diesel fuels is objectionable due to problems of fuel system filter plugging, fuel gauge malfunctions, icing conditions, sludge formation, and tank corrosion problems. Recently, the problems due to bacteria growth in water bottoms of fuel storage tanks and in the tanks of jet aircraft have been severe.

It is accordingly a principal object of the present invention to provide a means of rendering any entrained water present in petroleum distillates innocuous.

It is another object of the present invention to minimize the total content of dissolved and dispersed water present in petroleum distillates.

It is still another object of the present invention to provide a biocide which will minimize microbial fuel tank corrosion and other problems caused by the presence of bacteria.

Other objects and advantages and nature of my improved process will be apparent from the following description of the ingredients used in the process, the proportions thereof, the method of preparation, and the manner in which the aforesaid are applied to petroleum distillates.

I have discovered that an aqueous solution of water soluble salts possessing biocidal properties, when emulsified into an oil with a suitable emulsifier present, will form a stable water-in-oil emulsion, which may be added to petroleum distillates to accomplish the foregoing objects. Such water-soluble salts as potassium dichromate, sodium tetra-borate (borax), and copper sulfate are effective biocides, and aqueous solutions of these salts, and others, can be emulsified by this process, to achieve the desired results.

The following example is further illustrative of the invention, and it will be understood that the invention is not limited thereto.

*Example*

An aqueous solution of potassium dichromate was prepared to a concentration of ten percent, by the addition of 107 grams of potassium dichromate per liter of solution. This aqueous solution was slowly added to calcium petroleum sulfonate, using a mixer or paddle, in the ratio of 3 parts by volume of the aqueous solution to one part of the sulfonate and oil phase, until a rather viscous emulsion was prepared.

This emulsion is stable on storage through a wide temperature range, without any water or oil separation. The emulsion is non-abrasive and non-corrosive, and can be pumped through any type of gear pump or proportioning pumps of the variable stroke plunger type.

When the above emulsion was introduced into a light petroleum distillate, such as jet engine fuel, containing dissolved and dispersed water, it absorbed the entrained water. The relative ratio of emulsion to the water content of the fuel is not critical, but it appeared that addition of one part emulsion for each two parts of water contained, was most effective. When this treated fuel was allowed to stand in a glass container, it was noticed that the emulsion broke and that the water phase settled readily to the bottom of the container.

Due to the presence of the potassium dichromate, the aqueous phase has a specific gravity greater than 1, and this promotes a more rapid settling out to the bottom, where a biocide is needed in jet fuel storage tanks, as well as the wing tanks of jet aircraft.

A jet fuel containing 70 parts per million of dissolved water, when treated at a dosage of 35 parts per million with the emulsion of this invention, will be effectively inhibited against bacteria growth in the water bottoms. The emulsion of this example contains approximately 7% potassium dichromate, and it has been found that a 2% solution of potassium dichromate is an effective biocide for water bottoms of jet fuel tanks.

Having thus set forth and disclosed the nature of my invention, what is claimed is:

1. In the process of rendering water present in petroleum distillate fuel oils innocuous and inhibiting bacterial action therein by adding a biocide thereto, the improvement which comprises dissolving sufficient biocide in water to obtain up to about a 10% solution by weight of the biocide, forming a water-in-oil emulsion of the said solution in a petroleum oil with a petroleum sulfonate as an emulsifying agent, and thereafter adding the emulsion to a petroleum distillate fuel oil containing an emulsion breaking quality of entrained water, causing the emulsion to break, increasing the specific gravity and settling properties of the water phase while providing a bacterial biocide in the separated water.

2. The process of claim 1 in which the ratio of water phase to oil phase present in the emulsion is from about 1 to 6 parts by volume of the water phase to each part of oil phase.

3. The process of claim 2 in which the ratio of water phase to oil phase is about 3:1.

4. The process of claim 1 in which the biocide is selected from the group consisting of potassium dichromate, sodium tetra-borate, and cupric sulfate.

References Cited

UNITED STATES PATENTS

| 1,617,739 | 2/1927 | Averill | 252—328 |
| 2,337,466 | 12/1943 | Herbert | 167—16 |
| 2,680,058 | 5/1954 | Harris et al. | 44—76 |
| 2,975,042 | 3/1961 | Summers | 44—78 |
| 3,002,826 | 10/1961 | Norris | 44—51 |

OTHER REFERENCES

Merck Index, 7th Edition, page 840.

DANIEL E. WYMAN, *Primary Examiner.*

Y. H. SMITH, *Assistant Examiner.*